Patented June 15, 1954

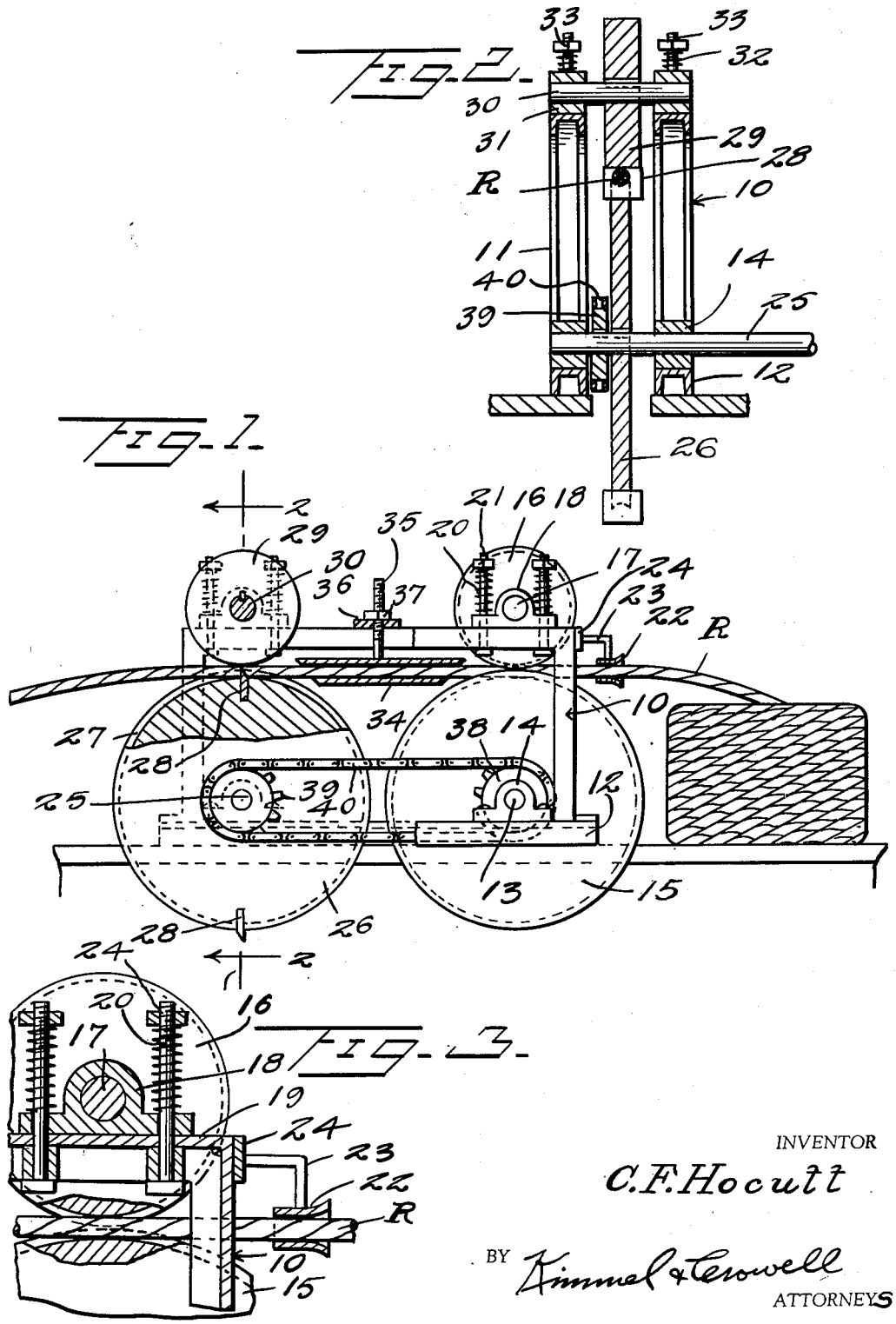

2,681,107

UNITED STATES PATENT OFFICE 2,681,107

DEVICE FOR CUTTING ROPE INTO PREDETERMINED LENGTHS

Clyde F. Hocutt, Berry, Ala.

Application March 29, 1951, Serial No. 218,228

1 Claim. (Cl. 164—68)

The invention relates to a rope cutter.

An object of this invention is to provide a machine whereby rope may be cut into even lengths.

Another object of this invention is to provide a rope cutting machine which is of simple construction and includes a rope feeding means with a rotatable cutting wheel having one or more cutting blades thereon. The diameter of the cutting wheel and the spacing between the cutting blades will determine the length of each piece of rope.

With the above and other objects in view, my invention consists in the arrangement, combination and details of construction disclosed in the drawings and specification, and then more particularly pointed out in the appended claim.

In the drawings:

Figure 1 is a detailed side elevation partly broken away and in section of a rope cutter constructed according to an embodiment of this invention.

Figure 2 is a sectional view taken on the line 2—2 of Figure 1.

Figure 3 is a fragmentary vertical section of forward feeding wheels and rope guide.

Referring to the drawing, the numeral 10 designates generally a frame structure which is formed of a pair of inverted U-shaped channel members 11 disposed in spaced apart relation and secured to lower channel members 12. A shaft 13 is journalled in bearings 14 secured to the lower or base member 12 and is adapted to be connected to a suitable source of power supply.

The shaft 13 has fixedly mounted thereon a peripherally grooved wheel 15 which is of substantially large diameter, and the wheel 15 has disposed in substantially contacting relation therewith a second or upper pressure wheel 16. The pressure wheel 16 is fixed to a shaft 17 journalled in bearings 18 which are spring tensioned on the upper frame bar 19 by means of springs 20 and bolts 21. This arrangement permits a thickened portion of the rope to pass through the device without material disalignment thereof since a progressive yielding effect of the component parts is thus produced.

A length of rope R is adapted to be extended between the two wheels 15 and 16, the latter being also grooved and the rope R is guided toward the wheels 15 and 16 by means of a flared thimble or guide member 22. The guide member 22 is carried by an L-shaped supporting member 23 which is fixed to a transversely disposed bar 24 secured between the inverted U-shaped frame members 11.

The frame 10 also has journalled between the frame members 11 thereof a second shaft 25 on which a wheel 26 is fixedly secured. The wheel 26 is formed with a peripheral groove 27, and one or more rope cutting blades 28 are secured to the wheel 26 and project from the periphery thereof for cutting engagement with the rope R as the latter is pushed forwardly between the wheel 26 and an upper pressure wheel 29. The upper pressure wheel 29 is mounted on a transversely disposed shaft 30 which is journalled in bearings 31, and the bearings 31 are under pressure by means of springs 32 engaging about spring tensioning bolts 33.

A tubular guide 34 is disposed between the wheels 15 and 26 in alignment with the meeting point between the wheels 15 and 16 and 26 and 29. The guide sleeve 34 has extending upwardly therefrom a threaded guide supporting bolt 35 which engages through a transversely disposed supporting bar 36 fixed between the upper frame members 19.

The bolt 35 has threaded thereon a nut 37 so that the guide 34 may be vertically adjusted to guide the rope in a substantially straight line between the forward wheels and the rear wheels. The shaft 13 has fixed thereon a sprocket 38 and the shaft 25 has fixed thereon a sprocket 39.

An endless chain 40 engages about the sprockets 38 and 39 and provides for equal rotation of the two wheels 15 and 16.

In the use and operation of this invention the rope R is extended from a coil positioned forwardly of the machine and is guided through the forward guide thimble 22. The rope is passed between the wheels 15 and 16 and is pushed forwardly through the guide member 34 to the cutting wheel 26 and the pressure wheel 29. The cutting wheel 26 in the present instance has mounted thereon a pair of cutting blades 28 which are disposed in diametrically opposed position so that two lengths of rope will be cut with each revolution of wheel 26. The specific length of the rope which is cut is determined by the spacing between the cutter blades and the diameter of the cutting wheel 26. In the present instance, these cut lengths of rope are designed for use in forming rope handles on receptacles or the like.

What is claimed is:

A rope cutter comprising a frame, a lower pair of wheels carried by said frame with the axes thereof parallel, said wheels having grooved peripheries, an upper pair of wheels of substantially smaller diameter than said first pair of wheels disposed one above each of said lower wheels, said upper wheels having grooves in their peripheries aligned with the grooves in said first-mentioned wheels, axles for each of said wheels yieldably tensionable, bearings for each end of the axles of said second pair of wheels, an apertured base plate for each bearing seating on said frame, said frame having apertures therein aligned with the apertures in said base plates, bolts extending through the aligned apertures one on each side of each end of each axle, nuts on said bolts, and compression springs surrounding said bolts between said nuts and said base plate whereby yieldably to tension said bearings, said nuts serving to vary the tension thereof, a cutlery blade carried by and projecting radially from one of said lower wheels, a chain and sprocket driving connection between said lower wheels, a rope guiding thimble disposed forwardly of the other one of said lower wheels in the plane of the junction between said upper and lower wheels and aligned with the peripheral grooves therein, means supporting said thimble from said frame, a tubular guide between said pairs of wheels, and means supporting said tubular guide in the plane of the junction between said upper and lower wheels in alignment with said peripheral grooves.

References Cited in the file of this patent

UNITED STATES PATENTS

| Number | Name | Date |
|---|---|---|
| 437,413 | Eckerson | Sept. 30, 1890 |
| 1,185,790 | Greising | June 6, 1916 |
| 1,394,342 | Overbury | Oct. 18, 1921 |
| 1,468,452 | Barber | Sept. 18, 1923 |
| 1,829,456 | Robbins et al. | Oct. 27, 1931 |
| 2,390,096 | Goepfert | Dec. 4, 1935 |